Aug. 2, 1938.   E. A. GREEN   2,125,276
LOCK NUT
Original Filed July 30, 1932
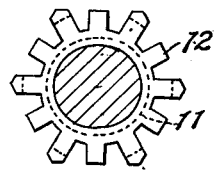
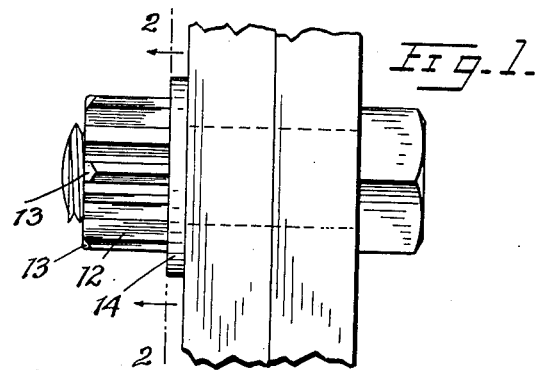
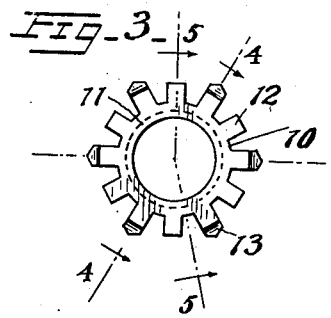
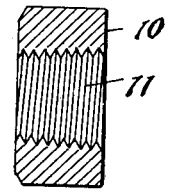
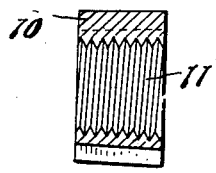
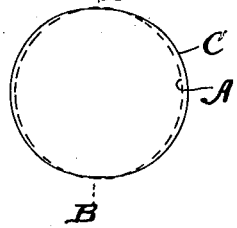
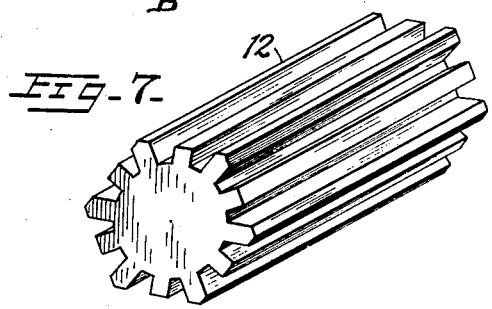
INVENTOR
EDWARD A. GREEN
Kwis Hudson & Kent
attys.

Patented Aug. 2, 1938

2,125,276

UNITED STATES PATENT OFFICE 2,125,276

LOCK NUT

Edward A. Green, East Cleveland, Ohio, assignor to Security Machine Products Company, Wilmington, Del., a corporation of Delaware Application July 30, 1932, Serial No. 626,458
Renewed July 31, 1934

2 Claims. (Cl. 151—21)

This invention relates to a combined holding and locking nut.

An object of the invention is to provide a holding nut, which when applied to a bolt will have a locking action upon the bolt threads.

A further object is to provide a holding nut wherein standard threads are employed and the thread pitch of the nut is not deformed, but which when applied to a bolt will have a locking action upon the bolt threads.

Another object is to provide a threaded nut which will produce and maintain a friction lock upon a bolt when applied thereto independently of bolt stress.

Another object is to provide a threaded nut, distorted with respect to its thread pitch diameter and having high diametral resilience of a range such that the nut will react on all bolt threads that are manufactured within the usual commercial tolerances established for thread pitch diameters to produce and maintain a friction lock upon a bolt when applied thereto.

A still further object is to provide a threaded nut, such as specified in the object just above mentioned, which is of relatively light weight as compared to its strength for resisting rupture and, wherein its thread and bearing values for receiving and transmitting the load are not diminished, while it will have the usual wrenching means as compared with standard commercial nuts for applying, adjusting and removing the nut with respect to the bolt.

Additional and further objects of the invention will become apparent hereinafter during the detailed description that is to follow of an embodiment of the invention.

In attaining the above enumerated objects it is proposed to provide a threaded nut having a transverse section such that the nut will have high diametral resilience and to distort the nut so that it will have a minimum thread pitch diameter substantially less than the thread pitch diameter of the minimum standard bolt to which the nut will be applied, wherefore, the nut will have uniform frictional engagement with the threads of bolts when applied thereto, even though the threads are of varying pitch diameters provided they are manufactured within the tolerances established for commercial bolts. More specifically, the objects of the invention are attained by providing a nut in the form of a tubular internally threaded member of such transverse section as to have high diametral resilience, distorting the member to provide a minimum thread pitch diameter as specified above and providing suitable means upon the member to give the same the requisite strength, bearing surfaces, and wrenching surfaces.

An embodiment of the invention is illustrated in the accompanying drawing, wherein, Figure 1 is a fragmentary side elevational view showing the nut applied to a bolt.

Fig. 2 is a sectional view taken substantially on line 2—2 of Fig. 1, looking in the direction of the arrows and shows the nut in rear end elevation.

Fig. 3 is an elevational view of the nut taken from the front end thereof.

Fig. 4 is a sectional view taken substantially on line 4—4 of Fig. 3, looking in the direction of the arrows, the diametral distortion of the nut being exaggerated.

Fig. 5 is an irregular sectional view taken substantially on line 5—5 of Fig. 3, looking in the direction of the arrows, the diametral distortion of the nut being exaggerated.

Fig. 6 is a diagrammatic end view of the nut opening showing in an exaggerated way the diametral distortion of the nut, and Fig. 7 is a perspective view of a length of bar stock from which the nut is formed.

Referring to the drawing, the nut will be seen to comprise a tubular member 10 that is internally threaded, as indicated at 11, and is of a transverse section of such thickness as to be capable of possessing high diametral resilience. The member 10 is provided exteriorly with a plurality of radial fins 12 that extend the full axial length of the member and have their outer ends terminating in the outline of a standard nut. In the drawing, the nut is illustrated as having a hexagonal outline, but it will be fully understood that the nut might have a square, round or other form of outline, as desired to provide the necessary wrenching surfaces. The fins 12 reinforce the tubular member 10 and hold or maintain the thread spirals together in the proper position. The fins 12 and the end of the member 10 at the rear of the nut provide an ample bearing surface for transferring the load stress when the nut is applied to a bolt and is screwed down into the proper position thereon. The forward ends of the longer fins 12 may be chamfered, as indicated at 13, as is usual in nut construction.

The threads 11 are formed in the member 10 by tapping said member with a standard tap and the member will then have a "free" fit on the bolt threads of the bolt to which the nut is to be applied. After the member 10 is tapped it is then distorted or compressed slightly in one diameter, changing the circular member and the opening therein into an oval member and opening. This distortion is scarcely discernible to the eye and, therefore, Figs. 2 and 3 of the drawing do not clearly illustrate the same. However, reference should be had to Fig. 6, wherein the circular form of the member or opening is therein indicated by the dotted lines A, while the oval form is indicated by the full line C, after the nut has been distorted along the diametral line B—B. When the nut has been so distorted, it will be seen that the same will have an "interference" or tight fit upon the bolt to which it is applied.

In order to increase the diametral resilience of the member 10, as well as the strength thereof, the member may be suitably heat treated after its distortion, as referred to above. The heat treating of the member, in addition to increasing its strength and diametral resilience, also serves to prevent the thread surfaces of the member and of the bolt to which it is applied, from "seizing" during the application to and the removal of the nut from the bolt. That is to say, the heat treated and hardened nut functions in the nature of a die and will be effective to correct imperfect threads upon the bolt.

In Figs. 4 and 5 of the drawing, the diametral distortion of the nut is exaggerated to illustrate that such distortion does not have to be uniform from end to end of the nut, but that it may be desirable to distort the nut to a greater extent adjacent its outer end than at its inner end to permit the nut to more easily take the threads of the bolt and to thus facilitate its application thereto. It should be understood, however, that the distortion of the nut might be uniform from end to end and probably would be, except in the case of nuts of very small size and extremely fine threads, where it would be desirable to provide the non-uniform distortion referred to above.

It is proposed to construct the nut from bar stock, such as special sections of cold drawn steel and it will be noted that the nut is so designed that it may be economically produced in such manner and by the usual methods of production employed in the manufacture of standard commercial nuts.

The bar stock may be formed in the desired shape, that is hexagonal, square, or any other desired polygonal shape, and is then provided with exterior fins running the longitudinal length thereof and having their outer ends terminating in the desired hexagonal or other polygonal shape, (see Fig. 7). The bar stock is then drilled and severed to form to the separate nut blanks, after which the severed blanks are tapped, then distorted along a diametral line as previously mentioned, and then heat treated to give the nut the desired diametral resilience.

The manner in which a nut, formed as specified above, that is a nut in the form of a tubular member having a section such as to possess high diametral resilience and being distorted along one diametral line, acts when applied to a bolt will now be described.

When the nut is applied to a bolt it will have a tight or "interference" fit thereon due to the diametral distortion of the nut to provide a minimum thread pitch diameter less than the minimum thread pitch diameter of the standard bolt with which the nut is to be used. However, since the tubular member forming the nut possesses high diametral resilience and since the member was originally tapped to have a free fit upon the bolt, it will be seen that the member will expand along its minimum diameter and adapt itself to the bolt, while, because of its inherent diametral resilience it will have a tendency to return to oval form and will, therefore, frictionally engage or interlock with the bolt threads at diametrically opposite points along its minimum thread pitch diameter. It will be noted that, since the member possesses a high range of diametral resilience, it will be capable of making the necessary diametral adjustments to fit all threads of varying pitch diameters upon bolts manufactured within the tolerances established for commercial bolts. If the nut is operating under a light load there will be no further expansion in its minimum diameter, other than that caused by its application to the bolt, but should the load, transmitted through the angularly disposed surfaces of the threads, exceed the resistance of the nut to diametral distortion, the nut will be expanded in its minor diameter and contracted in its major diameter until it becomes substantially round. However, upon the reduction of the bolt tension, either because of the stretch of the bolt or the wear of the several surfaces of contact thereof, or for other reasons, the nut will, due to its inherent diametral resilience, return to its oval form and effectively grasp the bolt threads for nut locking purposes. Therefore, there will be at all times and under all conditions effective resistance to the turning of the nut on the bolt. On the other hand, a standard nut only has efficient frictional locking effect with the bolt threads under maximum bolt tension, that is, the locking effect of a standard nut is in direct proportion to the bolt stress of tension.

It is appreciated that a nut constructed in accordance with the present invention will be somewhat weaker than a nut of standard design when made of the same material, but it is proposed to form the nuts of a material different from that ordinarily used in nut manufacture and capable of being heat treated to a substantially greater tensile strength. Also, if the loss of bearing surface, due to the resilient design of the nut is material, such loss may be compensated for effectively by using a washer 14 of material similar to that of the nut and interposed between the two bearing surfaces in the usual manner, see Fig. 1.

It will be noted that the nut of the present invention is of extremely light weight per unit of thread length, which fact, together with the active grasping or locking effect of the nut provides a distinct advantage over the usual heavy loose fitting nuts which in service are subject to severe vibration, impacts and shock. A nut constructed in accordance with the present invention prevents the destruction of the thread surfaces of the bolt, whereas, in nuts of the usual construction it is necessary to make frequent adjustments and replacements of the threaded parts, owing to excessive wear therebetween and which multiplies rapidly with the length of time and service. It will further be noted that a nut constructed, as specified above, retains all the essential features of a standard commercial nut as to strength, bearing values of thread and base, standard threads and provision for wrenching, while at the same time, because of its section designed to possess high diametral resilience and because of its distortion to provide a minimum thread pitch diameter, it will have uniform frictional grasping or locking engagement with the threads of a bolt when applied to threads of varying thread pitch diameters manufactured within the various tolerances established for commercial bolts.

Although a preferred embodiment of the invention has been illustrated and described herein, it should be understood that the invention is susceptible of various modifications and adaptations within the scope of the appended claims.

Having thus described my invention, I claim:

1. A combined holding and locking nut comprising, a substantially completely internally threaded tubular member of a transverse section such that the member is diametrally resilient and being provided with a plurality of exterior radially projecting axially extending fins the outer ends of which terminate in the outline of a standard nut to furnish wrenching surfaces, said member being diametrally distorted substantially from end to end thereof to have a minimum thread pitch diameter less than the minimum thread pitch diameter of any standard bolt with which it would be used.

2. A combined holding and locking nut comprising a diametrally resilient internally threaded tubular member having an exterior outline corresponding to that of a standard nut to provide wrenching surfaces and provided around its perimeter with a plurality of circumferentially spaced inwardly extending slots whereby stiffening angles in the transverse section of the member are eliminated, said member being diametrally distorted to have a minimum thread pitch diameter less than the minimum thread pitch diameter of any standard bolt with which it would be used.

EDWARD A. GREEN.